United States Patent
Fasold et al.

(10) Patent No.: US 8,272,371 B2
(45) Date of Patent: Sep. 25, 2012

(54) DEVICE AND METHOD FOR NEUTRALIZING ACIDIC CONDENSATE IN A MOTOR VEHICLE

(75) Inventors: Michael Fasold, Auenwald (DE); Dirk Traichel, Bietigheim-Bissingen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 387 days.

(21) Appl. No.: 12/568,955

(22) Filed: Sep. 29, 2009

(65) Prior Publication Data
US 2010/0242928 A1 Sep. 30, 2010

(30) Foreign Application Priority Data
Sep. 30, 2008 (DE) .......................... 10 2008 049 625

(51) Int. Cl.
*F02B 33/44* (2006.01)
*F02B 47/08* (2006.01)

(52) U.S. Cl. ................ 123/568.12; 123/568.11; 60/278; 60/605.2

(58) Field of Classification Search ............ 60/272, 60/273, 274, 276, 277, 278, 281, 282, 285, 60/295, 297, 301, 302, 309, 310, 317, 288, 60/605.2; 123/568.11, 568.12, 568.15, 568.16, 123/568.17; 701/108
See application file for complete search history.

(56) References Cited

U.S. PATENT DOCUMENTS

| | | | | |
|---|---|---|---|---|
| 3,808,805 | A * | 5/1974 | Miramontes C. | 60/274 |
| 3,817,221 | A * | 6/1974 | Nohira et al. | 123/25 Q |
| 3,871,343 | A * | 3/1975 | Nagai et al. | 123/704 |
| 4,656,831 | A * | 4/1987 | Budininkas et al. | 60/297 |
| 5,121,602 | A * | 6/1992 | McCorvey | 60/310 |
| 6,851,414 | B2 * | 2/2005 | Gao et al. | 123/568.12 |
| 8,051,659 | B2 * | 11/2011 | Yamashita et al. | 60/602 |
| 2005/0011183 | A1 * | 1/2005 | Ripper et al. | 60/286 |
| 2007/0193270 | A1 | 8/2007 | Roozenboom | |
| 2009/0193794 | A1 * | 8/2009 | Robel et al. | 60/295 |

FOREIGN PATENT DOCUMENTS

| | | |
|---|---|---|
| DE | 102005050133 A1 | 4/2006 |
| WO | WO2004011784 A2 | 2/2004 |
| WO | WO2009099528 A2 | 8/2009 |

OTHER PUBLICATIONS

EP Search Report EP 09 17 1038.

* cited by examiner

*Primary Examiner* — Stephen K Cronin
*Assistant Examiner* — Raza Najmuddin

(57) ABSTRACT

Disclosed is a device and a method for neutralizing an acidic condensate in an internal combustion engine with exhaust gas recirculation system, wherein the exhaust gas recirculation system has an exhaust gas recirculation cooler for cooling a hot exhaust gas stream, a metering system is provided that meters an alkaline substance into the exhaust gas stream and is arranged upstream of the exhaust gas recirculation cooler.

10 Claims, 3 Drawing Sheets

DEVICE AND METHOD FOR NEUTRALIZING ACIDIC CONDENSATE IN A MOTOR VEHICLE

CROSS REFERENCE TO RELATED APPLICATIONS

Priority is claimed based on Federal Republic of Germany patent application no. DE 10 2008 049 625.1 filed Sep. 30, 2008, the entire disclosure of which is incorporated herein by reference.

TECHNICAL FIELD

This disclosure generally relates to an internal combustion engine with an exhaust gas recirculation device.

BACKGROUND OF THE INVENTION

The present invention concerns internal combustion engines with an exhaust gas recirculation device. In particular, the invention concerns the neutralization of acidic condensate in a vehicle furnished with such an internal combustion engine with exhaust gas recirculation.

In order to comply with the exhaust gas regulations for diesel vehicles that are becoming more stringent worldwide, extensive internal and external measures on the engine are required. These measures include, for example, cooled exhaust gas recirculation (EGR) that enables a significant reduction of the nitrogen oxide emissions. The realization of the EGR can be done with a conventional high-pressure EGR circuit or with a low-pressure EGR circuit. In the latter case, a portion of the exhaust gas is removed downstream of the turbine and the particle filter, recirculated and mixed with fresh air upstream of the compressor.

Within the motor water is produced by fuel combustion that then leaves via the exhaust system in the form of water vapor. In this connection, for example, in case of a truck, several cubic meters of water per 100,000 km are produced. By using exhaust gas recirculation a reduction of the NOx values is achieved. Currently, mainly the high-pressure EGR system variety is employed that however has several disadvantages in comparison to the low-pressure EGR system. When using low-pressure EGR systems, as mentioned before, a portion of the exhaust gas downstream of the diesel particulate filter is supplied to an exhaust gas cooler which then cools the already expanded exhaust gas. By means of the EGR cooler, a cooling to below the dew point (80 to 140EC) of the water-soluble media ($H_2SO_4$, $H_2SO_3$, $HNO_3$, HCl and $H_3PO_4$) contained in the exhaust gas is achieved which leads to the formation of acidic condensates. Because of the acidic condensate (pH approximately 1.5-5) all components downstream including the EGR cooler are subject to strong corrosion which can lead to their destruction when they are not made from appropriate high-quality materials or coated in an expensive way.

Accordingly, it is necessary to neutralize the produced acidic condensate in order to increase the service life of the components.

U.S. Pat. No. 5,857,324 discloses a device and a method for removal of gases and particulate material from automobile exhaust gas. The device comprises a heat exchanger connected to the automobile exhaust gas system for cooling exhaust gas and for condensing at least a portion of the exhaust gases to a liquid condensate. The condensate and at least one part of the particulate material are separated from the gases that are not condensed and the condensate is returned into a liquid-filled tank. In a first chemical reactor the condensate is treated wherein the acids present in the liquid are neutralized, for example, by means of an alkali metal hydroxide.

U.S. 2004/0050373 A1 discloses a device and a method for improving the service life of lubricant oil in a diesel engine with an EGR system. For this purpose, a chemical filter is positioned either in the EGR flow or in the vicinity of the intake socket; the filter filters out the acidic components from the EGR stream before they can enter the intake socket. In this connection, metal carbonates, metal oxides, metal hydroxides, active carbon, ion exchange materials and other natural adsorbent materials such as limestone are employed as adsorbent materials.

A disadvantage of these solutions is that upon neutralization solid materials, for example, calcium sulfate and the like, are produced which must be disposed of separately. Moreover, their efficiency is locally limited, i.e., the reaction takes place, for example, only within the limestone fill. When the neutralization then is not complete, there is still acidic medium present. Depending on the expected condensate quantity, large quantities of resin (i.e. ion exchanger) are required. Moreover, for chemical neutralization, particularly with respect to weak acids, significant time expenditure is required in order to obtain a satisfactory neutralization (pH 6-7).

Since not all salts of the existing acids will deposit as a solid material, the water-soluble salts in the system can migrate further and can deposit on heat-exposed components in the internal combustion engine (valves, movable parts, etc.) and thus form a corresponding coating (salt layer). Thus, even though a neutralization would be achieved, there remains the disadvantage of possible deposits on hot surfaces where the water will evaporate and the salt will remain as a deposit.

It is therefore an object of the present invention to provide a device and a method for neutralization of acidic condensate in internal combustion engines with EGR system for the purpose of avoiding the disadvantages of the prior art.

It is another object of the present invention to provide such a device and corresponding method whose function is fast, reliable and requires only minimal space.

SUMMARY OF THE INVENTION

It is therefore an object of the present invention to provide a device and a method for neutralization of acidic condensate in internal combustion engines with EGR system for the purpose of avoiding the disadvantages of the prior art.

It is another object of the present invention to provide such a device and corresponding method whose function is fast, reliable and requires only minimal space.

In accordance with the present invention, this is achieved by arranging a metering device for metering an alkaline (basic) substance into the hot exhaust gas stream upstream of the exhaust gas recirculation cooler.

In accordance with the present invention this is furthermore achieved with respect to the method in that the hot exhaust gas stream is introduced into the exhaust gas recirculation cooler together with an alkaline (basic) substance.

Preferably, the alkaline (basic) substance is ammonia.

The ammonia is preferably supplied by a direct storage media, by an adsorption or desorption media, or by thermolysis/hydrolysis of solid or liquid auxiliary compounds.

Preferably, the alkaline (basic) substance is supplied from an SCR (selective catalytic reduction) catalyst system that is connected to the internal combustion engine.

In one embodiment of the device, arranged downstream of the exhaust gas recirculation cooler a water trap is provided that has a pH sensor arranged therein.

Preferably, a plurality of pH sensors are provided along the intake path of the internal combustion engine.

In regard to the method, the actual pH value of the condensate is determined by means of a pH sensor that is disposed in a water trap arranged downstream of the exhaust gas recirculation cooler.

Preferably, in the method according to the present invention, a plurality of pH sensors monitors the pH value of the condensate along the intake path of the internal combustion engine.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
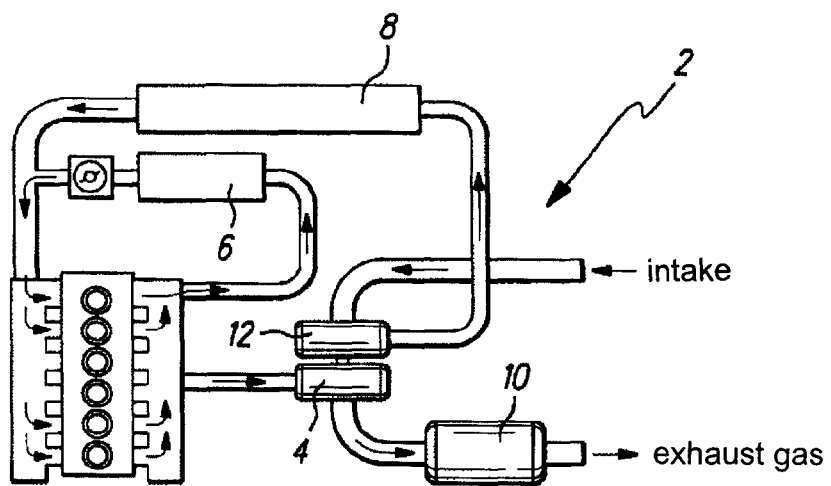
FIG. 1 shows a schematic view of a high-pressure exhaust gas recirculation system according to the priori art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related neutralizing acidic engine exhaust condensate as disclosed herein. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 schematically illustrates the configuration of a high-pressure exhaust gas recirculation system (high-pressure EGR) 2 according to the prior art. In such a system, a portion of the exhaust gas is removed upstream of the turbine 4 of the exhaust gas turbocharger, is cooled within the exhaust gas recirculation cooler 6 and subsequently is admixed to the fresh air downstream of the air-cooled charge air cooler 8. In this case, the exhaust gas that has been recirculated into the compressed charge air is at a high pressure level; therefore, this system configuration is referred to as a high-pressure exhaust gas recirculation system.

Figure 2:
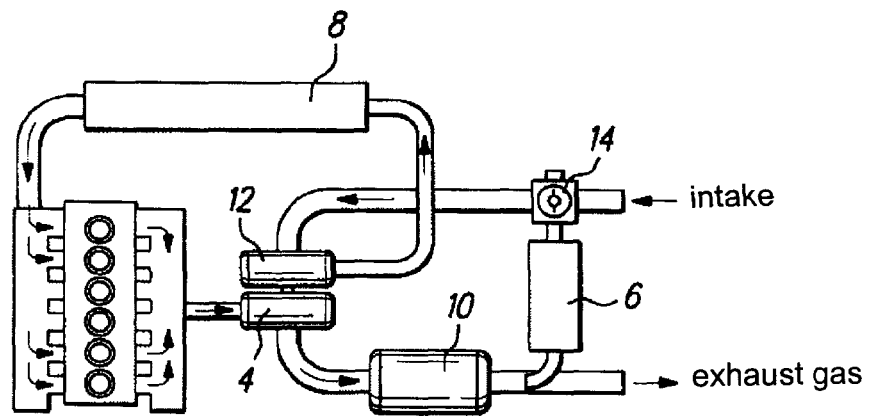
FIG. 2 is a schematic view of a low-pressure exhaust gas recirculation system according to the prior art.

When, as shown in FIG. 2, the exhaust gas is removed downstream of the diesel particulate filter 10 and the turbine 4, this is configuration referred to as a low-pressure exhaust gas recirculation system (low-pressure EGR) because in this case the exhaust gas has already expanded in the turbine 4. In this situation the recirculated exhaust gas is also cooled, subsequently however admixed to the fresh air upstream of the compressor 12 of the exhaust gas turbocharger and is thus admixed also upstream of the charge air cooler 8. As shown in FIG. 2, an additional EGR throttle valve 14 can be employed that, in case of minimal exhaust gas mass flow, can increase the pressure differential between the exhaust conduit and the intake conduit and therefore increases the EGR rate.

The exhaust gas introduced into the EGR cooler, depending on the operating point of the internal combustion engine, is loaded with differing amounts of moisture. Because of the cooling action in the EGR cooler condensate is formed that, as a result of the components contained in the fuel and motor oil, contains acid ($H_2SO_4$, $HCl$, $HNO_3$, $H_3PO_4$ etc.). Depending on the fuel quality, the pH value of the condensate can fluctuate greatly. This also is the cause of the problems associated with current systems in which the required quantities for neutralization cannot be reliably predicted; also, when using e.g. $CaCO_3$ there are also solid materials formed upon neutralization that must be treated appropriately.

Figure 3:
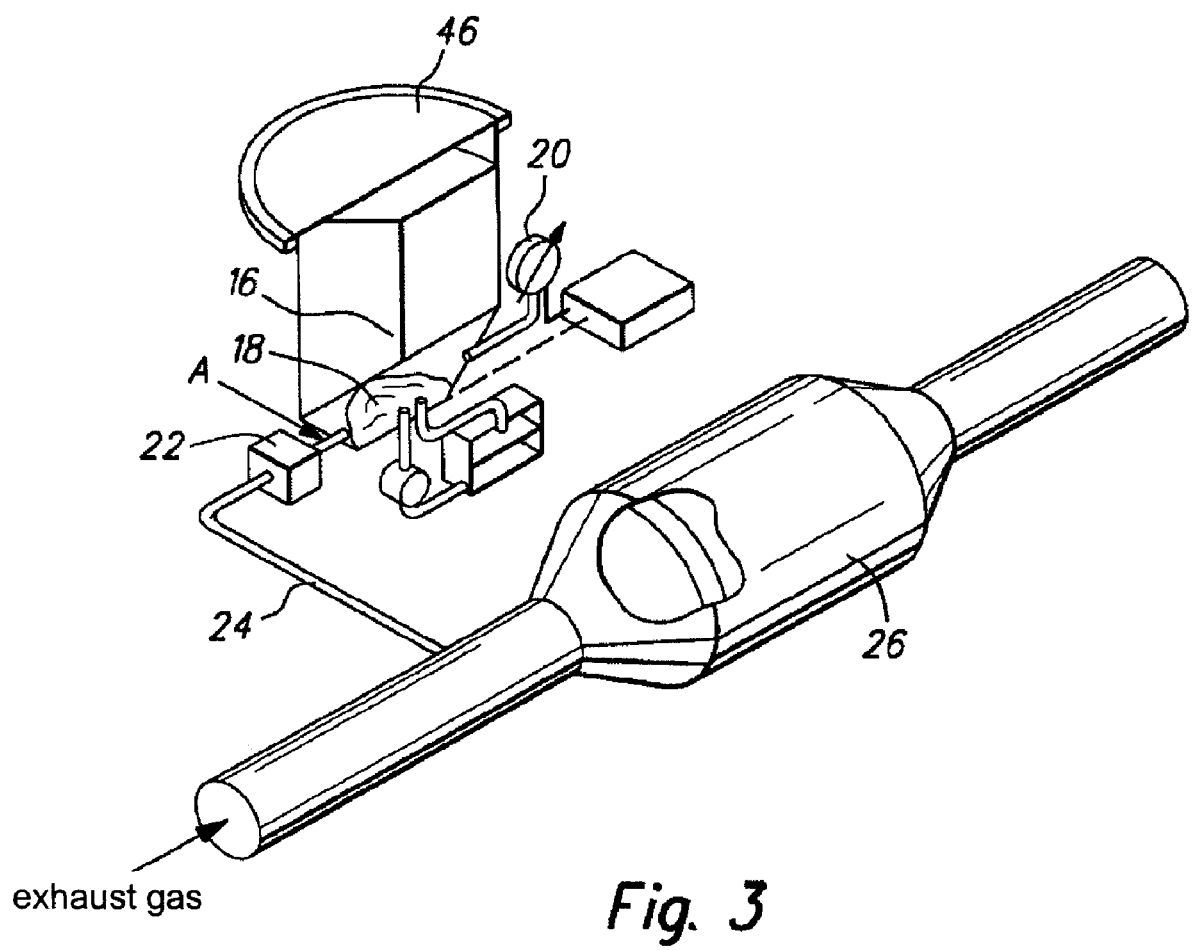
FIG. 3 shows schematically the configuration of a solid material SCR system according to the prior art.

According to the invention an alkaline solution or a gas that is in contact with water forms an alkaline solution, for example, ammonia, and together with the still hot exhaust gases is introduced into the EGR cooler. When the acids condense within or downstream of the EGR cooler, at the same time a corresponding alkaline solution will condense and the neutralization is therefore taking place at the moment of condensate formation. This system has the advantage that the neutralization already occurs at the moment of condensation closely below the dew point and thus a corrosive acid attack on the components (cooler, conduits, charger etc.) is avoided. Moreover upon use of for example, ammonia, no water-insoluble salts are formed that in a subsequent processing step would need to be filtered out. With regard to making available a gas such as ammonia, it is possible to employ already existing solid material SCR systems by employing.

for example, ammonium carbamate or ammonia that may be used as a gas. The term SCR (selective catalytic reduction) refers to the technology of selective catalytic reduction of nitrogen oxides in the exhaust gas of engines. The chemical reaction of reduction is selective, i.e., not all exhaust gas components are reduced but only the nitrogen oxides (NO, NO2). The ammonia required for this method is not supplied directly but instead is usually in the form of a 32.5% aqueous urea solution that is referred to in the industry uniformly as AdBlue®. Another possibility is the so-called solid material SCR system as illustrated schematically in FIG. 3. In this system a powdery ammonium carbamate 16 is used as the ammonia source. For sublimation of the solid material a liquid heat carrier medium 18 in a closed circuit is electrically heated and by means of a nozzle is then sprayed from below directly against the ammonium carbamate. This causes a gas mixture of ammonia and carbon dioxide to be produced from the sublimed ammonium carbamate so that the pressure in the space below the solid material increases. This gas pressure is detected by means of pressure sensor 20 and is adjusted to a predetermined threshold value in order to ensure a driving pressure differential relative to the exhaust gas manifold. Metering of the ammonia/carbon dioxide gas mixture is realized by means of a proportional metering valve 22. The gaseous reduction agent (NH3 and CO2) are supplied by supply conduit 24 into the SCR catalyst 26.

The interface for the metering action according to the present invention into the EGR cooler is in this connection between the metering valve 22 and the container 46 (point A in FIG. 3) that contains the ammonium carbamate.

The solubility of ammonia in water can be considered to be very high. Since in particular in case of the low-pressure EGR system the condensation downstream of the EGR cooler must not yet be entirely terminated (i.e., depending on the performance spectrum of the EGR cooler, a further cooling compared to the EGR cooler itself can still be realized in the charge air cooler or downstream of the charge air cooler) so that downstream of the compressor and the charge air cooler condensate can still be formed. By means of the system according to the invention, however, the neutralization is ensured even at further removed positions because a portion of the gas, such as ammonia, is entrained by the air stream and accordingly is available as an alkaline ammonia solution upon the condensation of water. Accordingly, the acids that are produced at these locations are also neutralized.

Figure 4:
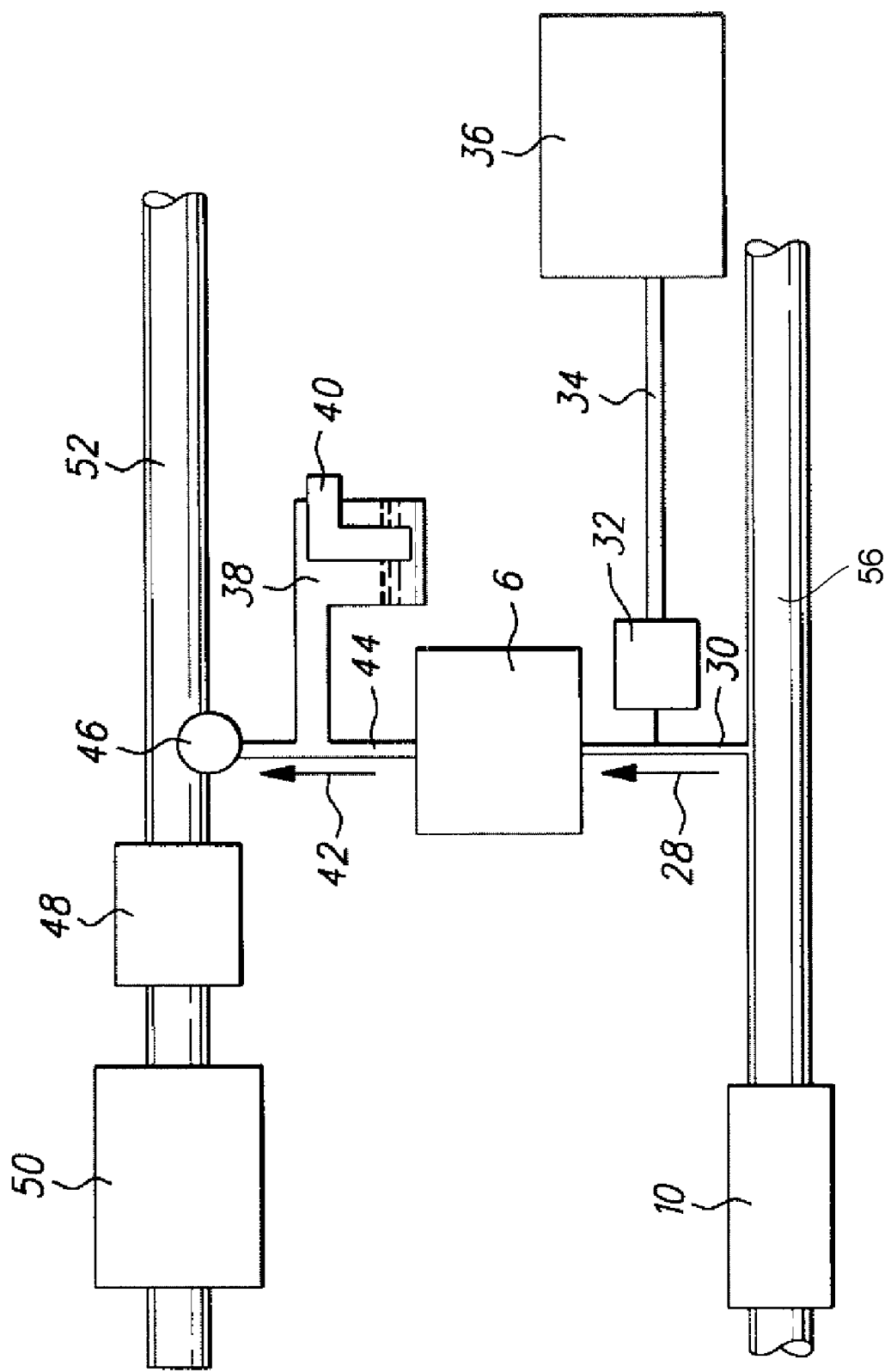
FIG. 4 schematically illustrates the function of the device according to the present invention.

FIG. 4 shows schematically the configuration of a device having an exhaust gas recirculation line 30, 44 interconnecting the exhaust gas conduit 56 and the air intake manifold 52 and according to the invention based on the example of a low-pressure EGR system in which the exhaust gas is removed downstream of the diesel particulate filter 10 and the turbine (not illustrated). Since in the present invention, in contrast to the use of ion exchange materials, no temperature limitations with respect to the functional range of the system is present. The invention is however not limited to low-pressure EGR systems but can also be applied in high-pressure EGR systems.

After removal of the exhaust gas (arrow 28) through the line 30 downstream of the diesel particulate filter 10 an alkaline (basic) substance is added to the exhaust gas stream. The ammonia is provided from direct storage medium (NH3 gas), adsorption or desorption media or by thermolysis/hydrolysis of solid or liquid auxiliary substances. When employing ammonia, the ammonia will bond with the water present in the exhaust gas and is then introduced together with the still hot exhaust gas into the EGR cooler 6. Thus, neutralization of the acidic condensate that is formed by cooling of the exhaust gas stream upon introduction into the EGR cooler 6 will take place at the moment of condensate formation. In this way, an acid attack on the components (cooler, conduits, charger) is prevented. The use of ammonia has also the advantage that no water-insoluble salts will be formed that would have to be filtered out in a subsequent processing step.

The addition of alkaline (basic) substances is realized through the line 34 by means of a gas metering system 32 that is in the form, for example, of a controlled solenoid injection valve and is arranged upstream of the EGR cooler 6. The ammonia gas can be removed from known existing SCR systems 36. In this connection, in particular when using solid material SCR (compare FIG. 3) relative to the AdBlue® solution no further conversion process is required (in case of AdBlue® catalytic conversion processes are required for producing ammonia). Generally, however a separate supply by employing a different storage media is also possible, for example, by means of solid or liquid auxiliary substances, or a direct supply by means of gas cylinders.

In order to enable a corresponding metering of the base, in a water trap 38 provided downstream of the cooler 6 a pH sensor 40 is provided that measures the existing pH value of the condensate and transmits the value to an appropriate logic circuit (not illustrated) for evaluation. The evaluation circuit calculates then the required quantity of ammonia that must be supplied and accordingly regulates the metering system 32. At the time the condensate is formed the ammonia will bond immediately with the water as a result of its great affinity and therefore can directly neutralize during condensation the acid that is contained in the condensate. In this connection, the neutralizing effect of the ammonia gas is not locally limited because the effect is maintained along the line 30 until the ammonia has been converted correspondingly.

After leaving the EGR cooler 6 the exhaust gas stream (arrow 42) is guided through line 44 to a valve 46 that supplies the exhaust gas subsequently to the compressor 48 and the charge air cooler 50.

When using several pH sensors, the existing acid potential can be monitored along the intake path and in this way an improved metering can be achieved. Further positions for the pH sensors can be the charge air cooler 50, the intake manifold 52 or the corresponding connecting lines.

It is not necessary to adjust precisely a pH value of 7. Instead, it is sufficient when a pH value with a range of, for example, 6-8 is maintained which is to be viewed as an uncritical range with regard to technical safety considerations.

The water (condensate) that is separated from the EGR stream by employing, for example, a cyclone separator, after the neutralization in the bypass system can be either carried to the exterior or, depending on the quantity of water that is being produced, can be completely or partially supplied to the intake system. In this connection the water can be returned, for example, by means of a pump downstream of the compressor 48 and the charge air cooler 50 and, if needed, can be passed without a pump through the compressor 48. Since the compressor may be damaged by water droplets, an introduction downstream of the compressor is preferred. A further possibility resides in that the neutralized condensate is used for direct water injection for reducing the combustion chamber temperature and thus the NOx values.

A further advantage of this device resides in that the required materials for neutralization are present in highly concentrated form and therefore a space-saving requirement-appropriate solution is possible.

Moreover, the solution according to the present invention produces only water-soluble reaction products and no solid materials.

Furthermore, it is advantageous that no additional pressure loss is generated by introduced filter systems for neutralization and separation of reaction byproducts and no bypass system is required in which the neutralization and filter unit is mounted in order to avoid as much as possible the total pressure loss in the main conduit, with the exception of the pressure loss caused by water separation (for example, by a cyclone device).

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A device for neutralizing an acidic condensate in an internal combustion engine with an exhaust gas recirculation system, comprising:
   an air intake manifold including a compressor;
   an exhaust gas conduit;
   the exhaust gas recirculation system including:
      an exhaust gas recirculation line connecting the exhaust gas conduit to the air intake manifold and delivering a recycled portion of exhaust gas flow from the exhaust gas conduit into the air intake manifold upstream of the compressor;
      an exhaust gas recirculation cooler arranged in the exhaust gas recirculation line for cooling a hot exhaust gas stream;
      a gas metering system delivering an alkaline substance into the exhaust gas recirculation line at a location upstream of the exhaust gas recirculation cooler, wherein the metering system meters the alkaline substance into the exhaust gas recirculation line;
      a water trap arranged in the exhaust gas recirculation line at a position downstream of the exhaust gas recirculation cooler and upstream of the air intake manifold; and
      a pH sensor arranged in the water trap and operative to measure the pH of condensate in the water trap,
      wherein the measured pH from the pH sensor is used to calculate a required quantity of the alkaline substance that must be delivered and accordingly regulates the metering system.

2. The device according to claim 1, wherein the alkaline substance is ammonia.

3. The device according to claim 2, wherein ammonia is supplied by direct storage media, by adsorption or desorption media, or by thermolysis/hydrolysis of solid or liquid auxiliary materials.

4. The device according to claim 1, wherein the alkaline substance is supplied by an SCR catalyst system that is connected to the internal combustion engine.

5. The device according to claim 1, comprising a plurality of pH sensors arranged along an intake path of the internal combustion engine.

6. A method for neutralizing an acidic condensate in an internal combustion engine with exhaust gas recirculation system wherein the exhaust gas recirculation system includes
   an exhaust gas recirculation line connecting an exhaust gas conduit to an air intake manifold and delivering a recycled portion of exhaust gas flow from the exhaust gas conduit into the air intake manifold;
   an exhaust gas recirculation cooler arranged in the exhaust gas recirculation line for cooling a hot exhaust gas stream;
   a gas metering system delivering an alkaline substance into the exhaust gas recirculation line at a location upstream of the exhaust gas recirculation cooler, wherein the metering system meters the alkaline substance into the exhaust gas recirculation line;
   a water trap arranged in the exhaust gas recirculation line at a position downstream of the exhaust gas recirculation cooler and upstream of the air intake manifold;
   the method comprising:
   introducing the exhaust gas recirculation line hot exhaust gas stream together with the alkaline substance into the exhaust gas recirculation line upstream of the exhaust gas recirculation cooler;
   determining an actual pH value of a condensate produced by the exhaust gas recirculation cooler by a pH sensor that is arranged in the water trap downstream of the exhaust gas recirculation cooler.
      wherein the measured pH from the pH sensor is used to calculate a required quantity of the alkaline substance that must be delivered and accordingly regulates the metering system.

7. The method according to claim 6, wherein the alkaline substance is ammonia.

8. The method according to claim 7, wherein ammonia is supplied by direct storage media, by adsorption or desorption media, or by thermolysis/hydrolysis of solid or liquid auxiliary materials.

9. The method according to claim 7, wherein the alkaline substance is supplied by an SCR catalyst system of the internal combustion engine.

10. The method according to claim 6, comprising the step of
   monitoring a pH value of a condensate produced by the exhaust gas recirculation cooler by several pH sensors arranged along an intake path of the internal combustion engine.

* * * * *